March 8, 1966  R. HUBER  3,239,386
DEPOLARIZER ELECTRODE FOR A PRIMARY BATTERY
CELL AND PROCESS OF PRODUCING SAME
Filed July 5, 1961  2 Sheets-Sheet 1

INVENTOR:
RICHARD HUBER
BY Erich M. H. Radde
AGENT

March 8, 1966   R. HUBER   3,239,386
DEPOLARIZER ELECTRODE FOR A PRIMARY BATTERY
CELL AND PROCESS OF PRODUCING SAME
Filed July 5, 1961   2 Sheets-Sheet 2

INVENTOR.
RICHARD HUBER

United States Patent Office 3,239,386
Patented Mar. 8, 1966

3,239,386
DEPOLARIZER ELECTRODE FOR A PRIMARY BATTERY CELL AND PROCESS OF PRODUCING SAME
Richard Huber, Ellwangen an der Jagst, Germany, assignor to Pertrix-Union G.m.b.H., Ellwangen an der Jagst, Germany, a company of Germany
Filed July 5, 1961, Ser. No. 121,977
Claims priority, application Germany, July 9, 1960, P 25,324
19 Claims. (Cl. 136—120)

The present invention relates to improvements in depolarized electrodes or cathodes for primary battery cells, and to improved methods for their manufacture. It is more particularly concerned with sheet-like depolarizer electrodes and such sheet-like electrodes which are flexible to be rolled into a depolarizer electrode body of desired shape or configuration.

In recent times, ever-increasing demands have been made on the capacity of batteries. This requires very large effective electrode surfaces, particularly where alkaline electrolytes are used. While many simple and low-cost methods for manufacturing negative electrodes or anodes with very large effective surfaces have been developed, the production of positive electrodes with such large surfaces has caused considerable difficulties. The conventional construction of a depolarizer with a rod-like current conductor and collector cannot accomplish the desired result because in this type of construction the ratio between the depolarizer mass volume and the surface is too unfavorable. In an effort to achieve the desired object, it has been proposed to coat a current conductor and collector sheet or band, for instance, a titanium, or tantalum foil, with a depolarizer mix paste and to roll the pasted sheet into a rolled cathode. However, when a battery with such cathodes is subjected to particularly high loads, the interface resistance between the depolarizer paste and the metallic current conductor and collector has been found to be so high that the capacity of such batteries is limited. Furthermore, such pasted metal foils could not be rolled into any desired configuration of electrode but, generally speaking, only cylindrically shaped bodies could be produced therewith because the mechanical adhesion between the depolarizer paste and the metal foil was not strong enough to permit any other shape but a simple cylindrical coil.

It is the primary object of the present invention to overcome the prior art disadvantages in the production of positive battery electrodes with very large surfaces and to provide such electrodes in a simple and inexpensive manufacturing process while also permitting the electrode to assume any desired shape or configuration This and other objects are accomplished in accordance with this invention by making the electrode of at least two layers, sheets, or webs of an oxidation-resistant material which is inert to the electrolyte used in the primary battery cell and placing a depolarizer mass between two of the layers. At least one of the layers must be permeable to the electrolyte to permit the same to react with the depolarizer mass.

In one preferred embodiment of the invention, at least one of the layers is electrically conductive. A rollable graphite foil may be used, for instance, for this purpose. In another preferred embodiment, one of the layers is a fibrous structure including absorptive natural or synthetic fibers. If the fibers are not of an oxidation-resistant material which is inert to the electrolyte, they may be impregnated with a substance which renders them so.

In the preferred method of the invention, a web of an oxidation-resistant material, which is inert to the electrolyte used in the cell, is passed through a moist depolarizer mass to place the mass on at least one of the web surfaces and another web comprising absorptive fibers is pressed against the depolarizer mass.

The above and other objects, advantages, and feature of the present invention will be more fully understood by reference to the following detailed description of certain preferred embodiments thereof, taken in conjunction with the accompanying drawing wherein FIG. 1 shows an appliance which may carry a suitably shaped battery including the positive electrode of this invention;

Figure 1:
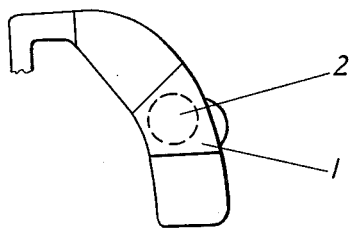

The flexible webs useful for the purposes of the invention include flexible graphite sheets, which are electrically conductive. Also, knitted or woven fabrics including suitable natural or synthetic fibers, such as linen, wool, cotton, glass, nylon, polyvinylacetate, polyvinylalcohol, rayon, and polyethylene. If these fibers are not of a material which is oxidation-resistant and inert to the electrolyte to be used in the battery, they must be impregnated or coated with a substance which imparts these qualities thereto. A suitable substance of this type is the aluminum salt of carboxymethyl cellulose. If these fabrics are to be made electrically conductive, they may also include conductive fibers, such as metal fibers which are oxidation-resistant and inert to the electrolyte. Suitable metals include Ti, Ta and alloys of these metals for chloride electrolytes and Ag, Co, Ni, steel and alloys of these metals for alkaline electrolytes. It is particularly advantageous if the fibers are absorptive.

The depolarizer mix may consist of manganese dioxide and acetylene black or graphite, as conventionally used in primary battery cells, and since the invention is not concerned with any specific depolarizer mass, no further reference thereto is needed for the skilled in the art.

In the preferred method of producing the positive electrode, a web of any of the indicated types is passed through a moist depolarizer mix paste and the thus coated or pasted web may be guided between the nip of two pressure rolls together with another one of the webs so that the other web is pressed against the depolarizer mass. In this manner, the depolarizer will be placed between the two webs and, if one or both of the webs are fabrics, the depolarizer paste will also be lodged within the interstices of the fabric.

If the webs consist of, or include, fibers which are not inert to the chemical reactions in the battery cell, they must first be passed through a bath containing an impregnating agent which renders the web oxidation-resistant and inert to the electroylte.

If the fibers of the fabric webs are of thermoplastic material and/or of a material which shrinks at an elevated temperature, the webs may be subjected to heat simultaneously with, or subsequent to, lamination, i.e. by the use of heated pressure rolls, to fuse the fibers at their point of contact or to shrink the fibers. This will assure a particular strong bond of the laminated electrode.

It is also possible to laminate an electric current conductor and collector sheet to one of the webs, preferably simultaneously with the lamination. This sheet may be a metal foil, for instance of Ag, Cu, Ni, Co, steel and steel alloys for alkaline electrolytes or Ti, Ta or a Cu-foil tightly inserted in a plastic foil made conductive by graphite, for chloride electrolytes.

It may also be found desirable to laminate simultaneously, or subsequently, an absorptive electrolyte carrier sheet to the other surface of the laminated electrode. This carrier sheet may, for instance, be a paper sheet impregnated with an electrolyte salt, i.e. zinc chloride, ammonium chloride, magnesium chloride, aluminum chloride, and a swelling agent, such as wheat flour, different kinds of starch, and cellulose compounds such as methyl- or ethylcellulose.

A laminated positive electrode, which carries the depolarizer mass between two webs one of which has laminated to its surface an electric current conductor and collector, and the other one of which has laminated to its surface an electrolyte carrier, may be rolled up into any desired shape or configuration and requires merely a zinc sheet or other negative electrode to complete the battery.

Figure 4:
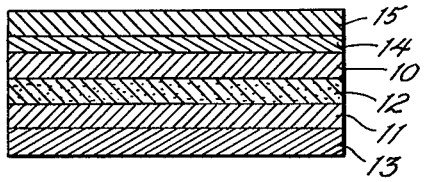
FIG. 4 is a cross section showing one form of a positive electrode according to the invention.

FIG. 4 illustrates a laminated positive electrode of this type, layers 16 and 11 indicating the two flexible webs holding the depolarizer mix 12 therebetween, with web 11 having the current conductor and collector sheet 13 laminated thereto while web 16 carries the electrolyte-impregnated paper sheet 14. 15 is the zinc electrode.

Figure 2:
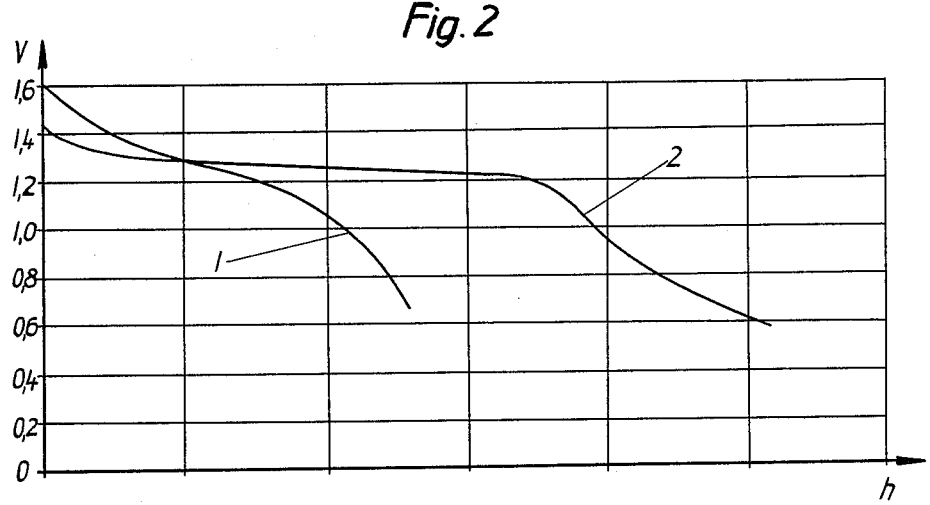
FIGS. 2 and 3 are performance graphs.

An as example of the considerable usefulness of the positive electrode of this invention in the construction of batteries, FIG. 1 shows a modern battery-powered hearing aid having a chamber 1 of trapezoidal cross section for holding the battery. As indicated by reference numeral 2, a conventional cylindrical battery (shown in broken lines) makes only partial use of the available space. In contrast to this, the positive electrode of the invention makes it possible to shape the battery so that it completely occupies the available space, thus making the entire space useful in the housing of the electrochemically active materials. This, of course, increases the capacity of the battery considerably, as is shown in FIG. 2. The discharge curve 1 shows a sharp voltage drop after only about 2½ hours of use of a battery of the shape indicated at 2 in FIG. 1 while a battery with the same depolarizer, electrolyte, and negative electrode but with a positive electrode of the present invention and shaped to occupy the entire available space, works usefully about twice as long, as shown by discharge curve 2. Furthermore, its discharge remains relatively constant for a much longer period of time while the voltage drop in the conventional battery is noticeable from the very beginning, as seen in curve 1.

Figure 3:
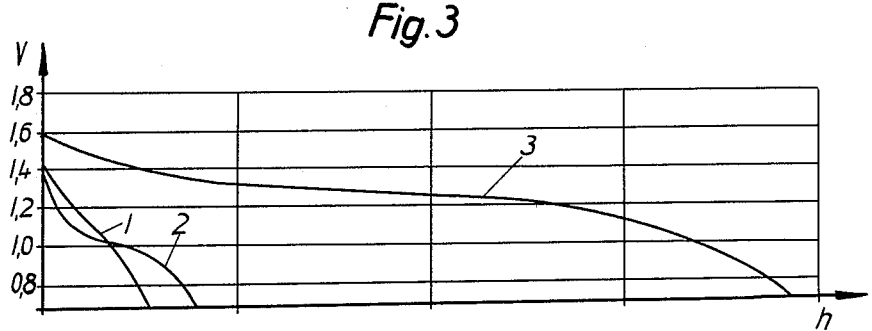

FIG. 3 also shows comparative discharge curves of conventional batteries and a battery built with a positive electrode according to the present invention. The discharge curve 1a indicates the operation of a conventional paper-lined mono-cell battery, curve 2a that of a conventional mono-cell battery with a gelatinized electrolyte and curve 3 gives the discharge of a mono-cell battery of the same size with an electrode according to the invention.

All discharges were measured over a continuous resistance of 2.50 ohm and each test showed the considerable increase in the operational life of the battery with the improved cathode. Furthermore, the efficiency and the short circuit current was much greater in the batteries with the improved cathode than in the comparative batteries. Thus, the cells of curve 1a showed an efficiency of 16.5% and a short-circuit current of 20 ampere, those of curve 2a an efficiency of 21% and a short-circuit current of 6.5 amphere while the corresponding parameters for the curve 3 batteries where 72% and 65 ampere. These comparative data also show the superiority of the batteries with the improved cathode of this invention.

It should also be noted that these cathodes may be constructed with any type of electrolyte, i.e. acidic, neutral or alkaline, and with any desired depolarizer mass. The only requirement is that the webs holding the depolarizer are inert to the chosen electrolyte. In addition to the indicated manganese dioxide depolarizers, mercuric oxide depolarizers may also be used, graphite, acetylene black, or activated carbon being mixed with the manganese dioxide or the mercuric oxide. Webs not inert to the electrolyte can be made inert by impregnating them with alkylcellulose ether made insoluble by treatment with organic acids.

Figure 5:
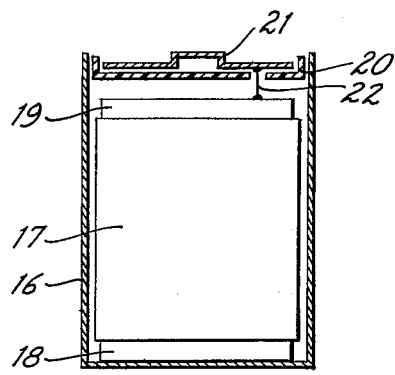
FIG. 5 is a part sectional view of a cell having a rolled electrode assembly.

The invention is further illustrated with reference to the drawing by the following examples, the negative electrode being designated at 15 in FIG. 4 and 23 in FIG. 7, the separator at 14 in FIG. 4 and 24 in FIG. 7, and the positive electrode with its current collector at 11, 12, 13, 16 in FIG. 4 and 25 in FIG. 7:

*Example 1.*—A cell according to the invention is made with a ngeative zinc electrode 15, 0.1 mm. thick, a kraft-paper separator 14, 50μ thick, that has been impregnated with the electrolyte, e.g. a solution of 70 parts water, 20 parts ammonium chloride and 40 parts zinc chloride, and a positive electrode consisting of a titanium wire mesh 16 of 0.1 mm. thickness, a layer of depolarizing mix 12 consisting of 65 parts manganese dioxide, 15 parts carbon black, 10 parts ammonium chloride, 2 parts zinc oxide and 45 parts of electrolyte solution as described above and a cotton fabric 11. The metallic mesh 13, which serves as current collector, protrudes above the winding as shown in FIGURE 5, as does also the zinc strip forming the anode. All the parts are rolled together on a winding machine following the principles of condensor manufacture and the roll thus produced is secured by an adhesive plastic band. Insertion in a zinc can effects contact with the negative electrode. The metallic cell closing cap is connected with the winding by means of a soldered or rivetted wire. This connection can also be effected by soldering, spotwelding or rivetting. A washer of electrically insulating material, e.g. plastic, is placed between the zinc can and the metal cap and the cell is then closed by swaging. In place of the titanium mesh it is possible to utilize a carbonized cotton fabric such as is readily available in the trade. In order to obtain a connection between the carbonized mesh and the metal cap, it is recommended to metallize the upper edge of the mesh, e.g. electrolytically.

*Example 2.*—The cell includes a zinc foil 15, 50μ thick, a separator 14, previously impregnated with a 30% solution of magnesium chloride as described in Example 1 and a depolarizing mix consisting of 88 parts $MnO_2$, 12 parts carbon black, 3 parts zinc oxide and 26 parts magnesium chloride solution of 30° Bé. The depolarizing mix is placed between two woven layers 11 and 16 of mesh, one made from glass fibers and the other from nylon fiber. A copper foil 13 protected by a conducting plastic layer, e.g. of synthetic rubber, polyisobutylene etc., which has been made electrically conductive with graphite, serves as collector. The thickness of the completer positive electrode is about 1 mm. The individual cell parts are rolled together as in Example 1.

*Example 3.*—A zinc foil 23 is used for the negative electrode as described above. The separator 24 is made from kraftpaper that has been impregnated with a 30% aluminum chloride solution. The positive electrode 25 consists of a tantalum foil, that has been coated with a mixture of 67 parts $MnO_2$, 12 parts carbon black, 11 parts graphite and 36 parts of a 30% aluminum chloride solution and the coated side is covered with a mesh of a polyvinylacetate that has been previously impregnated with the aluminum salt of carboxymethyl cellulose. These layers are folded in zig-zag form and fitted with metallic contact plates at the end and placed in a container, e.g. of plastic.

*Example 4.*—In this construction, the positive electrode 25 consists of copper mesh, a depolarizing mix of 95 parts $MnO_2$, 5 parts graphite and 50 mls. of a 15% solution of KOH saturated with zinc oxide and a polyamide fabric. The solution used to impregnate the separator paper 24 is a 50% KOH-solution saturated with zinc oxide. The negative electrode 23 consists of a zinc-lead-mercury-alloy containing 3% lead and 2.5 to 7% mercury. The individual layers can be folded in zig-zag fashion as in Example 3.

*Example 5.*—The positive electrode consists of an iron strip in which holes have been punched to improve adhesion. A layer of depolarizing mix is applied thereto, consisting of 77 parts $MnO_2$, 23 parts graphite and 23 parts of a 42% NaOH-solution with zinc oxide and the depolarizing mix covered with polyethylene fabric. The separator and the zinc anode are similar to the construction described in Example 4. The parts of the cell are rolled together as in the construction of condensors.

*Example 6.*—The trapezoidal cell shown in FIGURE 1, which is intended to fully occupy the space 1, consists of a laminated positive electrode including a tantalum foil, a depolarizer mix as described in Example 1 and a linen fabric, a separator which is impregnated with an electrolyte consisting of 76 parts water, 16 parts ammonium chloride and 14 parts zinc chloride, and a negative zinc foil electrode. From laminates made as described trapezoidal parts are stamped and inserted in the special trapezoidal container e.g. made from plastic or metal. When a metal container is used, the positive and negative electrode must both be insulated.

Figure 6:
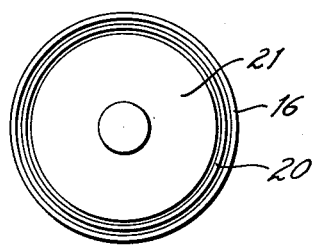
FIG. 6 is a top view of the cell illustrated in FIG. 5.
Figure 7:
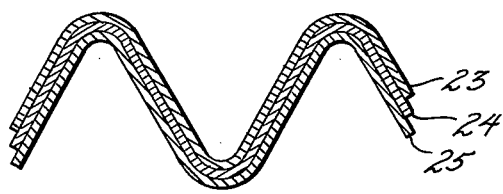
FIG. 7 is a sectional view of an electrode assembly is zig-zag form.
Figure 8:
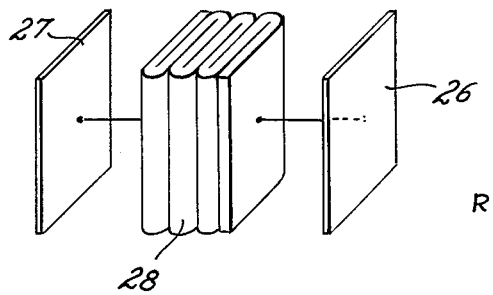
FIG. 8 is an exploded view of an electrode assembly having a folded electrode and contact plates.

FIGURES 5 to 8 illustrate certain structural embodiments according to the invention. FIGURE 5 shows a cell with rolled electrodes. 18 shows the protruding part of the zinc electrode which is in electrical contact with the can. 16 represents the can shaped container preferably of zinc. 19 illustrates the protruding portion of the positive electrode which by means of the connector 22 is in electrical contact with the metallic closure 21 which latter includes a contact cap. The positively charged parts of the cell are insulated from the negatively charged parts by means of insulator 20 which is preferably made from plastic. FIGURE 6 is a top view of a cell made according to FIGURE 5. 16 represents the container (preferably zinc), 20 the insulation and 21 the metallic closure with contact cap. FIGURE 7 illustrates an electrode assembly in zig-zag form wherein 23 indicates the negative electrode, 24 the separator impregnated with electrolyte and 25 the positive electrode according to the invention. FIGURE 8 shows an electrode assembly 28 folded in the manner as in FIGURE 7. 26 and 27 are the contact plates which are electrically connected to the negative and positive electrode. The whole assembly is placed in a special made container.

What is claimed is:

1. A depolarizer electrode for a primary battery cell, comprising two flexible, fabric-like webs of an oxidation-resistant material which is inert to the electrolyte used in the cell, at least one of said webs being permeable to the electrolyte and at least one of said webs being electrically conductive, and solely a depolarizer mass placed between said two webs and bonded to both said webs.

2. The depolarizer electrode of claim 1, wherein at least said conductive web is a fibrous web structure including electrically conductive fibers.

3. The depolarizer electrode of claim 2, wherein said conductive fibers are oxidation-resistant metal fibers which are inert to the electrolyte.

4. The depolarizer electrode of claim 1, wherein at least said permeable web is a fibrous structure including absorptive fibers.

5. The depolarizer electrode of claim 4, wherein said absorptive fibers are impregnated with a substance which renders the fibers oxidation-resistant and inert to the electrolyte.

6. The depolarizer electrode of claim 5, wherein said substance is the aluminum salt of carboxy methyl cellulose.

7. A method of producing a depolarizer electrode for a primary battery cell, comprising the steps of passing a flexible, fabric-like web of an oxidation-resistant material, which is inert to the electrolyte used in the cell, through a moist depolarizer mass to place said mass on at least one of the surfaces of the web and pressing against said mass another web comprising absorptive fibers with sufficient force to bond said mass and said webs together.

8. The method of claim 7, comprising the initial step of passing at least one of said webs through a bath containing an impregnating agent which renders the web oxidation-resistant and inert to the electrolyte.

9. The method of claim 7, further comprising the step of heating the fibrous web to a temperature sufficient to fuse the fibers together at their points of contact, the fibers being of a thermoplastic material.

10. The method of claim 7, further comprising the step of heating the fibrous web to a temperature sufficient to shrink the fibers, the fibers being of a material which shrinks at an elevated temperature.

11. The method of claim 7, further comprising the step of laminating an electric current collector and conductor sheet to one of said webs.

12. The method of claim 11, wherein the current collector and conductor sheet is laminated to the web simultaneously with the pressing of the web against the depolarizer mass.

13. The method of claim 7, further comprising the step of laminating an absorptive electrolyte carrier sheet to one of said webs.

14. The method of claim 13, wherein said carrier sheet is a paper web impregnated with an electrolyte salt and a swelling agent.

15. The method of claim 13, wherein the electrolyte carrier sheet is laminated to the web simultaneously with the pressing of the web against the depolarizer mass.

16. In combination: a depolarizer electrode for a battery containing an electrolyte, said electrode comprising two flexible fabric-like webs of oxidation-resistant material which is inert to the battery electrolyte, at least one of said webs being permeable to said electrolyte, and the other of said webs being electrically conductive, and solely a depolarizer mass placed between said webs and bonded to both said webs; and an absorptive electrolyte carrier sheet applied to the side of said permeable web away from said depolarizer mass.

17. The combination of claim 16 further comprising an electrically conductive collector electrode applied to the side of said depolarizer electrode opposite that to which said electrolyte carrier sheet is applied.

18. A depolarizer electrode for a primary battery cell, comprising two flexible, fabric-like webs of oxidation-resistant material which is inert to the electrolyte used in the cell, at least one of said webs being permeable to the electrolyte and at least one of said webs being electrically conductive, and solely a depolarizer mass placed between said two webs and pressure bonded to both said webs.

19. A depolarizer electrode for a primary battery cell, comprising two flexible, fabric-like webs of oxidation-resistant material which is inert to the electrolyte used in the cell, at least one of said webs being permeable to the electrolyte and at least one of said webs being electrically conductive, and solely a depolarizer mass placed between said two webs and pressure and heat bonded to both said webs.

References Cited by the Examiner

UNITED STATES PATENTS

| | | | |
|---|---|---|---|
| 1,548,539 | 8/1925 | Martus et al. | 136—107 |
| 2,297,248 | 9/1942 | Rudolph | 136—146.11 |
| 2,463,565 | 3/1949 | Ruben | 136—107 |
| 2,762,858 | 5/1956 | Wood. | |
| 2,851,509 | 9/1958 | DiPasquale et al. | 136—111 X |
| 2,880,259 | 3/1959 | Nowatny | 136—111 |
| 2,953,622 | 9/1950 | Gray | 136—146 |
| 3,060,256 | 10/1962 | Paulson | 136—138 |

WINSTON A. DOUGLAS, *Primary Examiner.*

JOHN R. SPECK, JOHN H. MACK, *Examiners.*